(12) United States Patent
Weber

(10) Patent No.: US 6,383,657 B1
(45) Date of Patent: May 7, 2002

(54) ALUMINUM CLAD ZINC BIMETALLIC COIN PLANCHET

(75) Inventor: Dennis H. Weber, Johnson City, TN (US)

(73) Assignee: Alltrista Zinc Products, Greeneville, TN (US)

( * ) Notice: Subject to any disclaimer, the term of this patent is extended or adjusted under 35 U.S.C. 154(b) by 0 days.

(21) Appl. No.: 09/740,159

(22) Filed: Dec. 18, 2000

(51) Int. Cl.[7] ................................................ B32B 15/20
(52) U.S. Cl. .................... 428/579; 428/650; 428/658; 228/235.2; 40/27.5
(58) Field of Search .................... 40/27.5; 428/579, 428/650, 658; 228/235.2, 235.3

(56) References Cited

U.S. PATENT DOCUMENTS

| | | | |
|---|---|---|---|
| 1,667,787 A | 5/1928 | Jaeger et al. | |
| 2,102,869 A | 12/1937 | Winter et al. | 75/178 |
| 2,169,441 A | 8/1939 | Winter et al. | 29/18 |
| 2,782,498 A | 2/1957 | Mushovic et al. | 29/497.5 |
| 3,381,364 A | 5/1968 | Winter | 29/472.3 |
| 3,607,147 A * | 9/1971 | Harrison | 29/191 |
| 3,790,373 A | 2/1974 | Pelzel | 75/146 |
| 3,798,028 A | 3/1974 | Gervais et al. | 75/178 AM |
| 3,940,254 A | 2/1976 | McMullen et al. | 29/196.6 |
| 4,330,599 A * | 5/1982 | Winter et al. | 428/675 |
| 4,362,262 A | 12/1982 | Winter et al. | 228/117 |
| 4,401,488 A | 8/1983 | Prinz et al. | 148/435 |
| 4,467,954 A | 8/1984 | Brenneman | 228/117 |
| 4,500,028 A | 2/1985 | Breedis et al. | 228/117 |
| 4,579,761 A | 4/1986 | Ruscoe et al. | 428/542.8 |
| 4,599,279 A | 7/1986 | Mirra et al. | 428/658 |
| 5,213,638 A | 5/1993 | Mahulikar et al. | 148/627 |
| 5,472,796 A | 12/1995 | Breedis | 428/679 |

FOREIGN PATENT DOCUMENTS

JP 52-129628 * 10/1977

* cited by examiner

*Primary Examiner*—John J. Zimmerman
(74) *Attorney, Agent, or Firm*—Ice Miller; Russell E. Fowler, II; Doreen J. Gridley

(57) ABSTRACT

A composite metal laminate coin planchet comprises commercially pure aluminum cladding layers metallurgically bonded to a zinc alloy core. The zinc alloy core may contain a hardening agent, such as copper or titanium, used to increase the hardness of the alloy above that of pure zinc. Trace amounts of other elements may also be present in the zinc alloy core or in the commercially pure aluminum cladding layers which do not affect their pertinent properties. The coin planchet is produced by a process comprising providing a strip or sheet of a zinc alloy core and creating a strip or sheet of composite material by metallurgically bonding commercially pure aluminum cladding layers to the zinc alloy. The coin planchets are then removed from the strip or sheet of composite material, and the remaining composite material is heated above its melting point to produce a zinc-aluminum alloy useful in die-casting.

30 Claims, 1 Drawing Sheet

ALUMINUM CLAD ZINC BIMETALLIC COIN PLANCHET

FIELD OF THE INVENTION

This invention relates to the field of currency production, and in particular to a composite metal laminate coin planchet for use in the production of silver-colored coins.

BACKGROUND

A coin planchet, the flat disk of metal from which a coin is made, must satisfy several criteria to be useful and commercially desirable. First, the planchet must be the proper color. It has become established in many countries that low value coins have a copper color, medium value coins have a silver color, and high value coins have a gold color. Therefore, the color of the materials used in the production of coin planchets is vitally important to the usefulness of the planchet.

Next, because color is so important to the circulation of the coinage, a coin planchet must have a finish that does not significantly tarnish or wear over years of time in circulation. If excessive tarnishing occurs, the coin may become difficult to identify and, therefore, undesirable to the public. Also, if the planchet is not wear resistant, the raised portions of a coin created from the planchet may wear off prematurely, greatly diminishing the circulation life of the coin.

Another important criteria is the weight of the coin planchet. For example, many modern vending machines differentiate coinage by their weight. Therefore, if a dime planchet has the weight of a quarter, a vending machine will not properly distinguish the coin as a dime. Further, if a coin is lighter than approximately 2 grams, the coin will generally not trigger the weighing mechanism inside a vending machine. If multiple light coins are inserted into the machine, the coins will collect on the mechanism, eventually causing the machine to jam and require servicing. The weight of the coin planchet is also important to ensure circulation of the coin by consumers, because extremely light or extremely heavy coins are difficult to handle and unsatisfactory to the public.

Additionally, the cost of the metal in a coin planchet should be low relative to the face value of the coin. The less expensive the metal in a coin, the greater seigniorage is gained by the minting process. Also, if the value of the metal in a coin becomes greater than the face value of the coin, the government is forced to change the size or makeup of the coin to lower the value of the metal in the coin so that the public will not sell the coins for the value of the metal inside them. Of course, changing the size or makeup of a coin is undesirable because it is time consuming and expensive.

The metal in a coin planchet must also be of sufficient hardness. A planchet must be hard enough to ensure the coin has a useful circulation life. However, it must be soft enough to be readily mintable, i.e., it must be soft enough to be readily deformed by coin dies during the minting procedure to impart the required insignia to the coin faces. If the metal is too hard, the expensive coin dies used to impart the insignia wear out too quickly, or an undesirable shallow impression is produced on the struck coin. To avoid shallow impressions, a hard coin planchet is typically heated to soften it before it is minted. This process is known as secondary annealing. If a planchet is hard enough to ensure a long circulation life but soft enough to not require secondary annealing, the seigniorage of the coin made from the planchet would be increased by the cost of the energy typically used to heat hard planchets.

Further, in the creation of composite coins, i.e., those with a core of one material and an outer cladding of another, it is desirable that the scrap produced by the planchet-making process may be used for some economically beneficial purpose. Generally, coin planchets are stamped from a strip or sheet of metal. Because coins are generally circular, this process leaves an unused web of material, which, if not useful for another purpose, is simply a waste product of the planchet-making process. However, if the unused material could be used to create some other product, the overall waste of the planchet-making process would be reduced. The overall cost of the process would then be decreased because less waste would have to be removed and the web byproduct could be sold. By decreasing the cost of the process, the seigniorage of the coin is increased.

United States silver-colored coins are currently made of two compositions. Nickel coins are created from an alloy containing 75% copper and 25% nickel. Dime, quarter, half-dollar, and dollar coins are composites, created by cladding a core of copper with the same alloy used in nickel coins. These compositions meet some of the desired attributes of coin planchets mentioned above, but the metal scrap that remains after planchets are stamped from these compositions does not have any economically beneficial use. Also, these compositions require secondary annealing. Furthermore, these compositions are relatively expensive, and a planchet composition that is less expensive is desirable.

Composite metal laminates, like that currently used for dime, quarter, half-dollar, and dollar coins, have found wide use in coinage. Composite metal coins having a dissimilar core and cladding are highly desirable commercially due to the fact that the beneficial characteristics of the core and cladding may be obtained in one coin. In an article made of a single material or alloy, modifying a property of the article without effecting undesired changes in other properties of the article is difficult. For example, if the magnetic properties of an alloy are changed by altering the composition of the alloy, the color or weight of the alloy may also be affected. However, by forming composites, the aesthetic properties of the cladding can be achieved while the bulk properties of the core material are retained. Therefore, by forming composite articles, one can more easily and cost-effectively change various properties of the article by modifying the composition or altering the thickness of the core or cladding.

The composite currently used for United States dime, quarter, half-dollar, and dollar coins fails, over an extended period of time, to satisfy the requirement of a consistent silver color. The extended wear that occurs over the life of a coin sometimes causes parts of the cladding to wear off, revealing the copper core beneath. Because the copper core is not silver in color, the coin must then be replaced. If a composite planchet was available that had both a core and a cladding of silver color, the many benefits of composite metal laminates could be realized and the circulation life of the coin made from the planchet would be increased.

Therefore, there is a need in the industry for a coin planchet which is uniformly silver in color and is composed of relatively inexpensive material. Further, the modification of a coin planchet property needs to be easy, cost-effective, and free from effecting undesired changes in other planchet properties. Additionally, there is a need for a coin planchet of sufficient weight with a finish that is tarnish and wear resistant. Also, a coin planchet is needed which is sufficiently hard, does not require secondary annealing, and is made of a composition such that scrap material from the planchet making process may be sold or used to make another product.

SUMMARY OF THE INVENTION

The present invention is directed to an article and a process that satisfy the need for an inexpensive, tarnish resistant, wear resistant, sufficiently hard, and sufficiently heavy composite metal laminate coin planchet which is silver in color, does not require secondary annealing, and has a composition such that the byproduct of its production process has economic value. The article comprises a planchet with two commercially pure aluminum cladding layers metallurgically bonded to a zinc alloy core. The zinc alloy core may contain about 0.5 percent to about 1.5 percent of a hardening agent, such as copper or titanium. This hardening agent increases the hardness of the alloy above that of pure zinc. Trace amounts of other elements may also be present in the zinc alloy core or in the commercially pure aluminum cladding layers which do not affect their pertinent properties.

The combination of the zinc alloy core and the commercially pure aluminum cladding layers is ideal for coin planchets, for the zinc alloy and commercially pure aluminum are inexpensive, silver in color, and sufficiently hard. The zinc alloy is heavier than the commercially pure aluminum, so the ratio of each in a coin planchet may be adjusted to achieve an acceptable weight. Further, the tarnish resistance of the commercially pure aluminum cladding layers compensates for the zinc alloy's poor tarnish resistance. Also, a coin planchet comprised of such a zinc alloy core and commercially pure aluminum cladding layers is extremely wear resistant and does not require secondary annealing prior to minting.

The process used to create the coin planchet comprises providing a strip or sheet of zinc alloy core and then creating a strip or sheet of composite material by metallurgically bonding two commercially pure aluminum cladding layers to the strip or sheet of zinc alloy core. After bonding the cladding layers to the zinc alloy core, objects are removed from the composite material, such as coin planchets. The composite material that remains in the strip or sheet is then heated above its melting point. This heating process creates a zinc-aluminum alloy which may be sold to members of the zinc-aluminum die-cast industry. Therefore, the byproduct of the planchet production process earns revenue for the planchet producer, increasing the seigniorage of the planchet.

These and other features, aspects, and advantages of the present invention will become better understood with reference to the following description and claims.

DESCRIPTION

Figure 1:
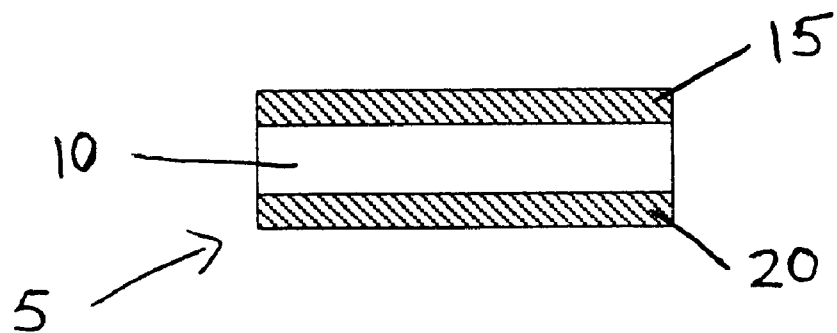
FIG. 1 is a side elevation view of one embodiment of the coin planchet of the present invention.
Figure 2:
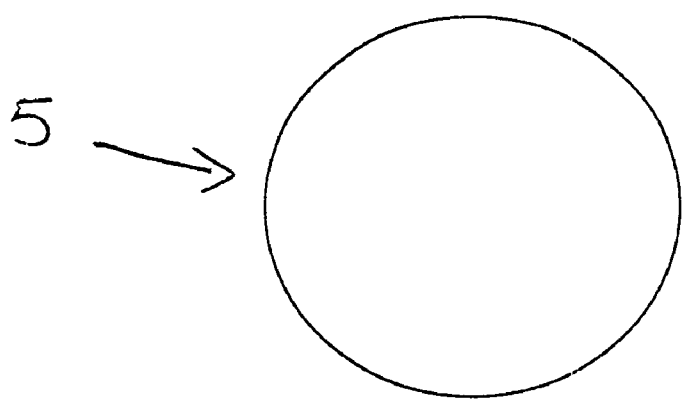
FIG. 2 is a top plan view of the coin planchet of FIG. 1.

As shown in FIG. 1, a coin planchet 5 is made of a zinc alloy core 10 having opposed sides, a first aluminum cladding layer 15, and a second aluminum cladding layer 20. A top view of the coin planchet is shown in FIG. 2.

The zinc alloy core 10 consists essentially of zinc. The term "consisting essentially of zinc" means that the zinc is substantially pure and is predominantly comprised of zinc, but may also contain additional elements. The purity of the zinc may be effected by the addition of hardening agents, or traces of elements produced by or not removed in the manufacturing of the zinc. For example, in one embodiment, the zinc alloy core 10 consists essentially of, by weight, about 98.5 percent to about 99.5 percent zinc, i.e., commercially pure zinc. The present invention will work, however, with lower purity levels, such as 90 percent zinc, by weight.

The zinc alloy core 10 may also contain a hardening agent, typically an element such as copper or titanium, used to increase the hardness of the zinc alloy core above the hardness of pure zinc. By adding an appropriate amount of hardening agent, the zinc alloy's hardness can be adjusted to ensure that it is sufficient for the desired type of planchet. In the preferred embodiment, the zinc alloy core 10 contains about 0.5% to about 1.5% of hardening agent.

Trace amounts of other elements may be present within the zinc alloy making up the zinc alloy core 10 without affecting its pertinent properties. Meeting the industry need for a planchet core material of silver color, the zinc alloy used in the zinc alloy core 10 is lustrous and silvery-blue. This zinc alloy is also relatively inexpensive.

Because zinc is sufficiently heavy for use in coin planchets and the zinc alloy is predominantly comprised of zinc, the zinc alloy is of sufficient weight to be used as the core 10 for the coin planchet 5. The zinc alloy, however, is not tarnish resistant. When the zinc alloy is exposed to the atmosphere, the surface of the alloy becomes dull gray in color in a relatively short period of time. Because a coin planchet with a dull gray finish is not desirable or marketable, the zinc alloy core 10 must be combined with a cladding that is tarnish resistant.

The first aluminum cladding layer 15 and the second aluminum cladding layer 20 are composed of commercially pure aluminum. Commercially pure aluminum is generally at least about 98.5% aluminum. The balance of other trace elements in the commercially pure aluminum do not affect the aluminum's pertinent properties. Meeting the industry need for a planchet cladding material of silver color, commercially pure aluminum is silvery-white. Further, commercially pure aluminum is relatively inexpensive and is of sufficient hardness to ensure a long coin circulation life and to allow proper minting. Commercially pure aluminum also has excellent resistance to corrosion and tarnishing, providing a long lasting lustrous finish. Additionally, commercially pure aluminum is relatively lightweight.

Therefore, the zinc alloy and commercially pure aluminum are an ideal combination for coin planchets. Both are relatively inexpensive, silver in color, and of sufficient hardness. Further, commercially pure aluminum, when used as a cladding material, meets the need for a corrosion and tarnish resistant planchet. To achieve an appropriately weighted coin planchet 5, the thickness ratios of the heavier zinc core 10 and the relatively light first 15 and second 20 aluminum cladding layers may be varied. Also, a coin planchet 5 containing the zinc alloy core 10 and first 15 and second 20 aluminum cladding layers has excellent coinability and is soft enough to not require secondary annealing before it is minted, thereby increasing the seigniorage of the planchet. Additionally, a coin planchet 5 created by the combination of the zinc alloy core 10 and the first 15 and second 20 commercially pure aluminum cladding layers has excellent wear resistance. Therefore, a coin made from such a planchet will likely have a long circulation life.

The coin planchet 5 is created by metallurgically bonding the first aluminum cladding layer 15 and the second aluminum cladding layer 20 to opposed sides of the zinc alloy core 10. One method for effecting such a bond is roll bonding, in which strips or sheets of one or more cladding layers and a core are fed through large rollers which apply high pressure to the one or more cladding layers and the core. This high pressure and the resultant high temperature create a metallurgical bond between the one or more cladding layers and the core. For the roll bonding process to be effective, the cladding layers, after the bonding process, must not be less than about 0.002 inches thick. Therefore, the cladding layers should typically not be less than about 0.01 inches thick before the roll bonding process. After the bonding process planchets of the desired size are removed from the resultant sheet of coin planchet composite. One manner of removing planchets is by punching the planchets from the sheet of coin planchet composite.

The material remaining in the sheet of coin planchet composite after the planchets are removed is known as "blanking scrap" or a "web." When the strip or sheet of coin planchet composite is made of the zinc alloy and commercially pure aluminum, the blanking scrap may be reused or sold. This economic benefit is obtained by heating the blanking scrap above its melting point, which produces a zinc-aluminum alloy desired in the die-casting industry. Zinc-aluminum die-cast products are extensively used in the automotive, architectural, aeronautical, and other industries. The alloys used in the diecasting process contain specific ratios of zinc and aluminum, and must not contain any more than trace amounts of other elements. Because the coin planchet composite is made of substantially pure zinc and commercially pure aluminum, the alloy made from the coin planchet composite may be sold to the die-cast industry. Then varying amounts of pure aluminum or pure zinc can be added to the coin planchet composite alloy to obtain the desired zinc-aluminum ratio. Therefore, a planchet composed of the zinc alloy core 10 and first 15 and second 20 aluminum cladding layers satisfies the industry need for an economically beneficial use for the blanking scrap created by the coin planchet manufacturing process.

One embodiment of the invention is a coin planchet which is between about 0.04 inches and 0.15 inches thick. A thinner coin planchet may not be preferred because the coin planchet may be too light. A coin planchet thicker than about 0.15 inches, on the other hand, may be too thick to be used in many vending machines.

Another embodiment of the invention is a coin planchet in which the first 15 and second 20 cladding layers each are not less than about 10% of the total thickness of the coin planchet. This limit on the thickness of the cladding layers is desirable as it ensures that a sufficient metallurgical bond is created between the cladding layers and the planchet core. Also, this thickness is sufficient to provide a long circulation life as the cladding layers are thick enough that they will not wear off of the planchet prematurely.

In another embodiment, the cladding layers are, combined, not more than 60% of the total thickness of the planchet. Therefore, in this embodiment, the zinc alloy core 10 is not less than 40% of the total thickness of the planchet.

Although the present invention has been described in considerable detail with reference to certain preferred versions thereof, other versions are possible. Therefore, the spirit and scope of the appended claims should not be limited to the description of the preferred versions contained herein.

What is claimed is:

1. A coin planchet comprising:
 a core having opposed faces, said core consisting essentially of zinc; and
 a first cladding layer and a second cladding layer metallurgically bonded to said opposed faces of said core, said first cladding layer and said second cladding layer consisting essentially of aluminum.

2. The coin planchet of claim 1 wherein said core is at least 98.5 percent zinc, by weight.

3. The coin planchet of claim 1 wherein said core is between about 98.5 percent zinc to about 99.5 percent zinc, by weight.

4. The coin planchet of claim 1 wherein said core further comprises a hardening agent.

5. The coin planchet of claim 4 wherein said hardening agent is copper.

6. The coin planchet of claim 4 wherein said hardening agent is titanium.

7. The coin planchet of claim 1 wherein the thickness of said planchet is between about 0.04 inches and about 0.15 inches.

8. The coin planchet of claim 1 wherein the thickness of said first cladding layer is at least 10 percent of the total thickness of said coin planchet and said second cladding layer is at least 10 percent of the total thickness of said coin planchet.

9. The coin planchet of claim 8 wherein the thickness of said core is at least 40 percent of the total thickness of said coin planchet.

10. The coin planchet of claim 1 wherein the thickness of said first cladding layer is at least about 0.002 inches and the thickness of said second cladding layer is at least about 0.002 inches.

11. The coin planchet of claim 1 wherein the weight of said planchet is at least about 2 grams.

12. A composite material comprising:
 a core having a first face and an opposing second face, said core consisting essentially of zinc; and
 a first cladding layer metallurgically bonded to said first face of said core and a second cladding layer metallurgically bonded to said second face of said core, said first cladding layer and said second cladding layer consisting essentially of aluminum.

13. The composite material of claim 12 wherein said core is at least 98.5 percent zinc, by weight.

14. The composite material of claim 12 wherein said core is between about 98.5 percent zinc to about 99.5 percent zinc, by weight.

15. The composite material of claim 12 wherein said core further comprises a hardening agent.

16. The composite material of claim 15 wherein said hardening agent is copper.

17. The composite material of claim 15 wherein said hardening agent is titanium.

18. The composite material of claim 12 wherein the thickness of said composite material is between about 0.04 inches and about 0.15 inches.

19. The composite material of claim 12 wherein the thickness of said first cladding layer is at least 10 percent of the total thickness of said composite material and said second cladding layer is at least 10 percent of the total thickness of said composite material.

20. The composite material of claim 19 wherein the thickness of said core is at least 40 percent of the total thickness of said composite material.

21. The composite material of claim 12 wherein the thickness of said first cladding layer is at least about 0.002 inches and the thickness of said second cladding layer is at least about 0.002 inches.

22. A process useful for creating coin planchets, the process comprising the steps of:
- providing a strip or sheet of a core material having a first face and an opposed second face, said core material consisting essentially of zinc;
- providing a first cladding layer consisting essentially of aluminum and providing a second cladding layer consisting essentially of aluminum;
- metallurgically bonding said first cladding layer to said first face of said core material and metallurgically bonding said second cladding layer to said second face of said core material, thereby creating a strip or sheet of composite material.

23. The process of claim 22, further comprising the step of removing from said strip or sheet of composite material a plurality of coin planchets, said strip or sheet of composite material thereby forming a web of unused composite material when said plurality of coin planchets are removed.

24. The process of claim 23, further comprising the step of heating said web of unused composite material above the melting point of said web of unused composite material to produce a zinc-aluminum alloy.

25. A coin planchet comprising:
- a core having a first face and an opposing second face, said core predominantly comprising zinc; and
- a first cladding layer metallurgically bonded to said first face of said core and a second cladding layer metallurgically bonded to said second face of said core, said first cladding layer and said second cladding layer predominantly comprising aluminum.

26. The coin planchet of claim 25 wherein said core comprises at least 98.5 percent zinc, by weight.

27. The coin planchet of claim 25 wherein said core comprises between about 98.5 percent zinc to about 99.5 percent zinc, by weight.

28. The coin planchet of claim 25 wherein said core further comprises a hardening agent.

29. The coin planchet of claim 28 wherein said hardening agent is copper.

30. The coin planchet of claim 28 wherein said hardening agent is titanium.

* * * * *